United States Patent
Daalmans et al.

(10) Patent No.: US 6,850,053 B2
(45) Date of Patent: Feb. 1, 2005

(54) DEVICE FOR MEASURING THE MOTION OF A CONDUCTING BODY THROUGH MAGNETIC INDUCTION

(75) Inventors: Gabriel Daalmans, Hoechstadt (DE); Roland Finkler, Erlangen (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/213,923

(22) Filed: Aug. 7, 2002

(65) Prior Publication Data

US 2003/0080728 A1 May 1, 2003

(30) Foreign Application Priority Data

Aug. 10, 2001 (DE) .......................... 101 39 379

(51) Int. Cl.⁷ .............................. G01P 3/46; G01P 3/48; G01B 7/14; G01B 7/30
(52) U.S. Cl. ..................... 324/164; 324/174; 324/207.2; 324/207.21; 324/225; 73/514.39; 73/514.31
(58) Field of Search ............................. 324/174, 207.2, 324/207.21, 225, 164, 163, 166, 207.22, 207.25; 73/514.39, 514.31, 514.01

(56) References Cited

U.S. PATENT DOCUMENTS

| 3,848,157 A | 11/1974 | Kripl |
| 4,441,077 A * | 4/1984 | Dodgen et al. ............. 324/164 |
| 6,462,535 B1 | 10/2002 | Schwabe |

FOREIGN PATENT DOCUMENTS

| DE | 1 201 587 | 4/1966 |
| DE | 37 30 841 A1 | 3/1988 |
| DE | 41 05 642 A1 | 9/1992 |
| DE | 38 80 268 | 10/1993 |
| DE | 298 13 276 U1 | 11/1999 |
| DE | 100 32 143 S1 | 5/2001 |
| GB | 2 121 968 A | 1/1984 |
| GB | 2 326 486 A | 12/1998 |
| WO | WO 01/23897 | 4/2001 |

OTHER PUBLICATIONS

IBM Technical Disclosure Bulletin, J.F. Kripl: Brushless Tachometer System, vol. 16, No. 1, Jun. 1973, pp. 237, 238.
G. Behr: "Alternating current tachometer machines operating according to the Ferraris principle" [Wechselstrom–Tachometermaschinen nach dem Ferrarisprinzip], ZMSR, vol. 8, 1959, pp. 355 to 360.
E. Habiger: "Foundation for dimensioning the Ferraris machines as a control element" [Grundlagen für die Bemessung der Ferrarismaschine als regelungstechnisches Bauelement], Elektrie, vol. 6 (1964), pp. 170 to 178.

* cited by examiner

*Primary Examiner*—Jay Patidar
(74) *Attorney, Agent, or Firm*—Henry M. Feiereisen (57) ABSTRACT

A device for measuring a motion of a moving electrically conducting body is disclosed. A magnetic field generated by, for example, electromagnets or permanent magnets, penetrates at least a partial area of the moving body. Two or more measuring devices are arranged outside the magnetic field to measure a measurement magnetic field that is induced by electrical currents in the moving body. The measuring devices are arranged essentially symmetrically with respect to the magnetic field generating means or the moving body. The measurement magnetic field represents at least one motion variable of the moving body. The measuring device is thereby no longer subjected to the temperature-dependent variations of the exciting field.

29 Claims, 3 Drawing Sheets

DEVICE FOR MEASURING THE MOTION OF A CONDUCTING BODY THROUGH MAGNETIC INDUCTION

BACKGROUND OF THE INVENTION

The invention relates to a device for measuring a motion of a moving body.

DE 37 30 841 A1 describes a motion sensor capable of inductively measuring the velocity and acceleration of a moving body. A main magnetic field which is constant in time and penetrates a disk orthogonal to the direction of motion is produced in a locally limited partial area of the disk near the edge of the rotating, electrically conducting disk forming the moving body. For producing the main field, two opposing permanent magnets are provided along an air gap through which the disk extends. These permanent magnets are also magnetically short-circuited on the sides facing away from the disk by a yoke made out of a magnetic material, for example iron, so as to form a closed magnetic circuit. The magnetic main field of the permanent magnets induces in the moving disk locally electrical eddy currents which in turn induce a counteracting magnetic eddy current field. To measure the magnetic flux density produced by the eddy currents, a Hall effect sensor or another magnetic field sensor, for example a magneto-resistive sensor, is provided on both sides of the gap. The magnetic field sensor can determine the tangential velocity or the angular velocity of the disk. Each of the two magnetic field sensors is arranged in a gap of a corresponding flux connector ring made of magnetic material, for example iron, and simultaneously in the air gap between the two permanent magnets. The flux collector rings each define a magnetic flux path in form of a loop which extends parallel to the disk or to the rotation plane of the disk and perpendicular to the main field. Each of the flux connector rings has a straight flush segment which extends between the corresponding permanent magnets and the disk, wherein the gap with the magnetic field sensor is formed in the center of the segment, and a second segment which is connected with the first straight segment and complements the first linear segment to form a closed flux path, with the second segment projecting outwardly in the radial direction from the rotation axis into the yoke connecting the permanent magnets. Each flux collector ring in the in the center section of the U-shaped second segment that extends parallel to the first section is surrounded by a corresponding detector coil. These two detector coils measure the time variation of the flux density produced by the eddy currents and thereby provide a measurement signal for the temporal change of the tangential velocity or the rotation speed, and also for the acceleration or the acceleration in the rotation speed of the disk. Both the magnetic field sensors and the induction coils are oriented so as to measure the flux of the eddy current field which extends along the loop flux paths of the respective flux collector rings in a direction tangential to the motion direction, which is the direction perpendicular to the direction in which the main field penetrates the moving body. Accordingly, the magnetic field sensor and the induction coils are, as viewed in the motion direction, at the same height as the partial region in the moving body that is penetrated by the main magnetic field so as to measure the tangential field of the eddy currents.

One problem with the inductive motion sensor described in DE 37 30 841 A1 is heating of the moving body by Joule heating due to the induced eddy currents, with the heating effect increasing with increasing rotation speed and/or speed of the moving body. This limits the application of the conventional inductive motion sensor for measuring the rotation speed and/or speed for two reasons. On one hand, the moving body cannot exceed a maximum temperature. On the other hand, even small temperature changes can falsify the measurement result. In particular, temperature variations cause a drift of the DC magnetic field of the permanent magnets, an additional thermal noise and a drift in the output voltage of the detector coils. In addition, the signal-to-noise ratio can also change due to the aforementioned thermal drift and the coupled interference fields.

In another inductive motion sensor known from DE 29 8 13 276 U1 for measuring rotational or linear accelerations, a special soft iron support is provided for the permanent magnet(s) whose pole shoes and legs project laterally over the permanent magnets. This arrangement captures almost all the magnetic field lines produced by the eddy currents in the moving body so that sufficiently large measurement signals are obtained even with relatively small magnets and a small acceleration. Moreover, from a certain value on, the eddy currents increasingly interact with the permanent magnetic field and weaken it so that only a small residual field remains. This reduces the temperature problems associated with high rotation speed of the moving body as compared to the motion sensor known from DE 37 30 341 A1 and increases the rotation speed range.

However, the measures proposed in DE 29 8 13 276 U1 for reducing the temperature in the moving body make the sensor sensitivity dependent on the rotation speed, which can cause additional problems when evaluating the results. DE 29 8 13 276 U1 also does not provide any concrete suggestions how to detect the magnetic eddy currents fields.

SUMMARY OF THE INVENTION

It is therefore an object of the invention to provide a device for measuring a motion of the moving body which at least partially eliminates or at least ameliorates the afore-described disadvantages of conventional devices.

The object is solved according to the invention by a device for measuring a motion of a moving body (or: a moving object) that is electrically conductive in at least one region, including
  a) magnetic field generating means (or: a magnetic field generator, magnetic field source) for generating a magnetic field, that penetrates the electrically conductive region of the moving body at least in a spatially limited partial region,
  b) at least one measuring device for measuring of a measurement magnetic field (or: measurement induction field) that it induced by the magnetic field of the magnetic field generating means in the electrically conducting region of the moving body depending on the motion of the moving body as a measure for at least one motion variable of the moving body,
whereby,
  c) the measuring device is offset in the motion direction of the moving body from the magnetic field generating means or from the magnetically activated partial region in the moving body.

The term magnetic field or measurement magnetic field is therefore it used both for magnetic field in the physical sciences terminology as well as for a magnetic induction field (or: the magnetic flux density) or a magnetic flux, which corresponds to the area integral of the flux density. The measurement or evaluation of the measurement magnetic field also includes measuring or evaluating its temporal change or another function of the measurement magnetic field. For the measurement of the moving body in the magnetic field, only the relative motion between the moving body and the magnetic field is important. Accordingly, the moving body can be stationary relative to a predetermined reference system, in particular the earth surface or to a machine part, with the magnetic field moving relative to this reference system, or the magnetic field can be stationary relative to the reference system, with the moving body moving relative to the reference system. The motion of the moving body is generally arbitrary and can be a translation, for example a linear motion, or a rotation as well as a combination of a translation and rotation.

The measuring device which is laterally offset does no longer measure the existing magnetic field and is therefore also not exposed to the changes of the magnetic field due to temperature variations or drift. Moreover, the construction and manufacture of device much simpler than conventional devices, since the magnetic field generating means and the measuring device can be produced and/or assembled independent of each other.

Advantageous embodiments and modification of the device of the invention are recited in the dependent claims.

Preferred magnetic field generating means for generating the magnetic fields are permanent magnets, in particular at least two permanent magnets with opposing (or: different) magnetic poles that face each other, with the moving body moving or movable in the gap between the poles.

In a particularly advantageous embodiment, magnetic flux conducting means (or: flux collectors, magnetic flux guiding means, yoke) are provided for conducting the exciting magnetic field of the magnetic field generating means and/or the measurement magnetic field. The magnetic flux guiding means can be used to concentrate the magnetic field at the magnetic field generating means, to reduce stray fields and to increase the field strength in the activated partial region of the moving body. In the measuring device, the additional magnetic flux conducting means can increase the effective permeability and thereby the mutual inductance, which produces a greater useful signal or measurement signal in the measuring device.

To optimize the functions, on one hand, for the magnetic flux generating means and, on the other hand, for the measuring device, the magnetic flux conducting means are preferably formed an/or arranged separately an/or formed with different geometries an/or of different materials. Alternatively, at least partially common magnetic flux guiding means can be provided for the exciting field and the measurement magnetic field, which can advantageously provide a compact design. The magnetic flux conducting means form or close preferably a magnetic circuit for the magnetic field of the magnetic field generating means or the measurement magnetic field. The magnetic circuit for the measurement magnetic field is preferably oriented in the motion direction, whereas the magnetic circuit for the exciting magnetic field is preferably oriented perpendicular to the motion direction.

A material and/or form for the magnetic flux conducting means should be selected so as to produce the lowest possible the eddy current losses an/or thermal noise. To accomplish this, the magnetic flux conducting means can be made of a material with a low specific resistance an/or can include measures for reducing eddy currents, for example a lamellar structures or slots. The material for the magnetic flux conducting means is generally at least predominately magnetically conducting and/or soft magnetic. If the magnetic flux conducting means for the magnetic field generating means, on one hand, and for the measuring device, on the other hand, have different designs, then the magnetic flux conducting means of the magnetic field generating means has preferably a higher magnetic permeability than the magnetic flux conducting means for the measuring device, since the gap of the magnetic flux generating means, through which the moving body moves, has to be bridged by the exciting magnetic field. In addition, the magnetic flux conducting means for the measuring device can be formed of a material having lower eddy current losses than the material for the magnetic flux conducting means for the magnetic field generating means. For example, the material for the magnetic flux conducting means for the measuring device can be a material in the form of iron powder or a ferritic magnetic material. The magnetic flux conducting means of the magnetic field generating means, on the other hand, can be made of a material with a high permeability, such as soft iron.

According to a particularly advantageous embodiment, the measuring device is arranged so as to be located essentially entirely outside the magnetic field of the magnetic field generating means. This has the advantage that thermal noise in the magnetic field practically does not affect the measurement signal of the measuring device.

The measuring device(s) is/are preferably arranged in the motion direction with an offset next to the magnetic flux conducting means for the magnetic field generating means or permanent magnets and hence practically entirely outside the magnetic field of the magnetic field generating means. In another embodiment, each measuring device is at least partially arranged inside the magnetic flux conducting means and thereby only offset relative to the permanent magnets.

The measuring device is typically arranged close to the magnetic field generating means, since the amplitude of the measuring magnetic field in the moving body is greatest at the edge of the partial region penetrated by the exciting magnetic field. The distance from the measuring device to the magnetic field generating means or to the partial region penetrated by the magnetic field in the motion direction can be greater than zero and preferably less than the dimension of the partial region penetrated by the magnetic field, as measured in the motion direction, or even zero, so that measuring device and by magnetic field generating means in the motion direction are arranged directly after the other.

In a particularly advantageous embodiment, at least one pair of measuring devices is provided. It is then possible by suitably arranging and electrically connecting the two measuring devices to add the useful measuring signals of the two measuring devices and to at least partially compensate or eliminate the interfering signals by a common mode suppression (or differential suppression). Such interfering signals are produced in particular when the distance between the measuring devices and the moving body changes which generally produce an interfering signal that increases with increasing rotation speed. These changes in the distance can be caused, for example, by excursions of the moving body from the predetermined path, for example, due to a wobble or tilt motion.

If one of the measuring devices of such a pair is arranged in the motion direction on one side of the magnetic field generating means or the partial region penetrated by the magnetic field, and the other measuring device of this pair is arranged on the opposite side, as viewed in the motion direction, and if the two measuring devices are connected so that the useful signals are added or can be added, then common signals produced by changes in the distance between the moving body and the measuring devices in the same direction, for example by tipping or wobbling, are subtracted from each other and therefore mostly compensated. Since the measurement magnetic field on opposite sides of the magnetic field generating means or the partial region of the moving body is generally oriented in the opposite direction, the two measuring devices in this embodiment are typically connected with an opposing electrical polarity. The two measuring devices can be arranged on the same side of the moving body or on opposite sides of the moving body. The arrangement on the same side of the moving body has constructive advantages.

If two measuring devices of a pair are arranged on the same side of the magnetic field generating means or the partial region penetrated by the magnetic field of the moving body, then these are preferably arranged on opposite sides of the moving body. In this way, interferences caused by a deformation or oscillations of the moving body can be at least partially compensated. Such a deformation of the moving body causes the moving body to approach one of the two measuring devices and likewise to move away from the other measuring device. Accordingly, the produced interfering signals are subtracted from each other when the measuring device is connected with a common mode circuit or connected with the same polarity, and thereby at least partially compensated as is typical for differential mode suppression. The two measuring devices preferably face each other.

In a particularly advantageous embodiment, the two last described embodiments are combined, so that two pairs of measuring devices are provided which each have two opposing measuring devices arranged on different sides of the moving body. Both pairs are arranged on opposite sides, as seen in the motion direction, of the magnetic field generating means or the partial region penetrated by the magnetic field in the moving body. With such an arrangement with four detectors and a corresponding circuit, interfering differential interfering signals as well as common mode interfering signals and thereby changes in the distance from the moving body over larger areas, caused for example by tilting or wobbling, but also local changes, as for example surface undulations, can be compensated.

The measuring devices have essentially the same distance from the magnetic field generating means and/or the moving body, and/or they are essentially arranged symmetrically to the magnetic field generating means and/or the moving body, and/or they are formed in an essentially identical manner. Each of these measures improves the suppression of interferences.

The at least one measuring device can measure the measurement magnetic field at different locations or in different directions. In a first advantageous embodiment, the measurement magnetic field is measured at a location where it is essentially perpendicular or vertical to the motion direction of the moving body, or a component of the measurement magnetic field that is oriented substantially perpendicular to the motion direction is measured. In another embodiment, the measurement magnetic field is measured at a location where it is essentially inclined or parallel (or: tangential) to the motion direction, or a component of the measurement magnetic field that is essentially inclined or parallel to the motion direction is measured.

In a particular advantageous embodiment, the at least one measuring device includes at least one induction coil (or: measurement coil, detector coil) and evaluates the electrical voltage induced in the coil(s) as a measure for the motion variable of the moving body, in particular an acceleration.

The at least one induction coil surrounds preferably a corresponding coil core and/or is terminated at its end faces by at least one termination element. Coil cores and/or termination elements preferably form magnetic field conducting means for the measurement magnetic field.

Alternatively or in addition to the measurement coil, the measuring device can include at least one magnetic field sensor, in particular a Hall sensor, a magneto-resistive sensor or a field plate, and obtain from the measurement signal of the magnetic field sensor that depends of the measurement magnetic field a measure of a motion variable of the moving body, in particular a velocity.

The magnetic field generating means and/or the measuring device(s) and/or the corresponding flux conducting means are preferably secured to a common support or several associated supports or support elements, in particular an angled sheet metal support, and/or thermally coupled with the support. The thermal coupling to the support has the advantage that heat produced by eddy current losses can be removed and the components of the motion measuring devices can be effectively cooled. This reduces thermal noise.

BRIEF DESCRIPTION OF THE DRAWING

The invention will be described hereinafter with reference to embodiments. Reference is also made to the drawings, where.

DETAILED DESCRIPTION OF PREFERRED EMBODIMENTS

Identical parts and quantities are indicated in FIGS. 1 to 6 with the same reference numerals.

A moving body whose motion is to be measured is indicated in FIGS. 1 to 6 with the reference numeral 2. The illustrated moving bodies 2 are in all embodiments made of an electrically conducting material, in particular, without limitations, of a metal such as copper (Cu) or aluminum (Al) or a metal alloy, such as steel.

Figure 1:
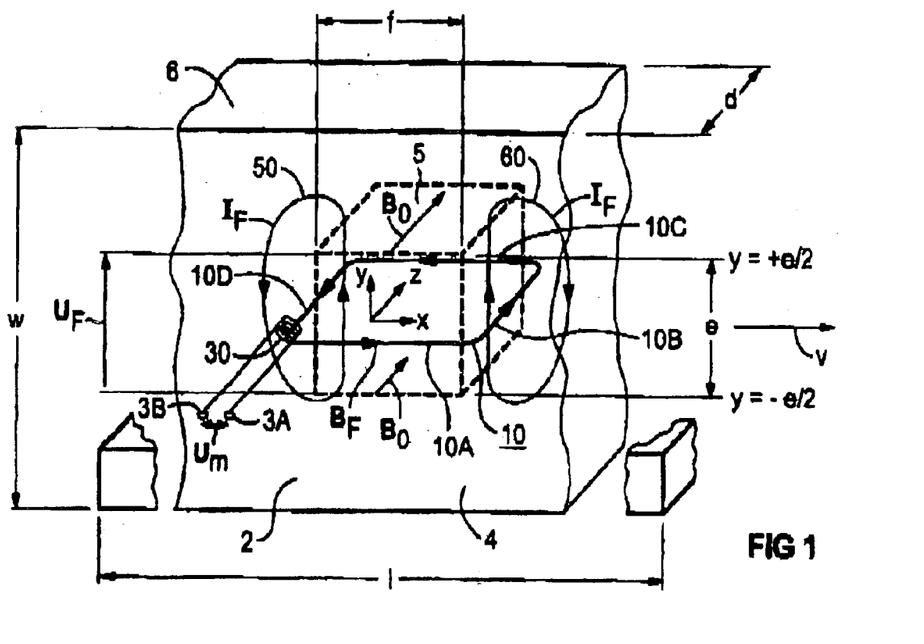
FIG. 1 shows schematically a perspective view of a device for measuring a motion of a translationally moving body.

In the embodiment according to FIG. 1, the moving body 2 moves in a Cartesian x-y-z-coordinate system with a vector velocity v in a straight line in the x-direction in the direction of the arrow. The moving body 2 is penetrated in a spatially limited, for example cuboid-shaped partial area 5 by a time-independent (or DC) magnetic field $B_0$ which extends in the z-direction and is perpendicular to the velocity vector v and perpendicular to a substantially flat surface 4 of the moving body 2. An outer partial area 6 surrounding the partial area 5 of the moving body 2 is free of the external magnetic field $B_0$. The transverse dimensions of the moving body in the y-direction are indicated by w and of the partial area 5 penetrated by the magnetic field $B_0$ by e, and the corresponding end faces of the partial area 5 in the y-direction are indicated by −e/2 and +e/2. The longitudinal dimensions of the moving body 2 in the x-direction are indicated by 1 and of the partial area 5 by f. The thickness or dimension of the moving body 2 in the z-direction is indicated by d.

The partial area 5 penetrated by the magnetic DC field $B_0$ passes through the moving body 2 with the velocity −v. This motion causes a temporal change in the magnetic flux, so that an electric voltage $U_F$ is induced in the y-direction in the partial area 5 penetrated by the magnetic field $B_0$, and a corresponding electric current $I_F$ of charge carriers is induced in the electrically conductive moving body 2. The flux lines of the current $I_F$ which is sometimes also referred to as Ferraris-current, are within the partial area 5 that is penetrated by the magnetic field $B_0$ approximately straight lines between the two end lines y=−w/2 and w=+w/2 in the y-direction and close via the outer partial region 6 that is not penetrated by the magnetic field $B_0$. This causes current loops or current eddies 50 and 60, i.e., eddy currents of closed loop currents, with an opposite orientation of the current flow before and after the partial region 5, as viewed in the x-direction.

Each current eddy 50 and 60 or the entire current field $I_F$ generates a magnetic flux density or magnetic induction in form of a measurement magnetic field $B_F$, which is sometimes also referred to as Ferraris measurement field or Ferraris induction field. An exemplary eddy of this measurement magnetic field $B_F$ is illustrated and includes two orthogonal or vertical flux paths 10B and 10D which extend through the current eddies 50 and 60 in opposite directions in the z-direction as well as two tangential flux paths 10A and 10C extending essentially parallel to the xy-plane, also with an opposite orientation. It is therefore approximately $$|B_F| \sim |I_F| \sim |v \times B_0|/\rho \tag{1}$$

wherein "~" indicates "proportional to", | | "the absolute value of", "x" a vector or cross product, and ρ the specific electrical resistance of the moving body 2.

For measuring the measurement magnetic field $B_v$, there is provided a measuring device with an induction coil 30 which is arranged with its coil axis essentially perpendicular to the xy-plane above the eddy current 50, and with two electrical connections 3C and 3D of the induction coil 30. The measurement magnetic field $B_F$ induces in the induction coil 36 an electric voltage, which can be tapped as a measurement voltage $U_m$ between the terminals 3A and 3B and is proportional to the time derivative or change $d|B_F|/dt$ of the measurement magnetic field $B_F$. The absolute value of the measurement voltage of the induction coil then becomes $$U_m \sim dv_x/dt \tag{2}$$

Figure 2:
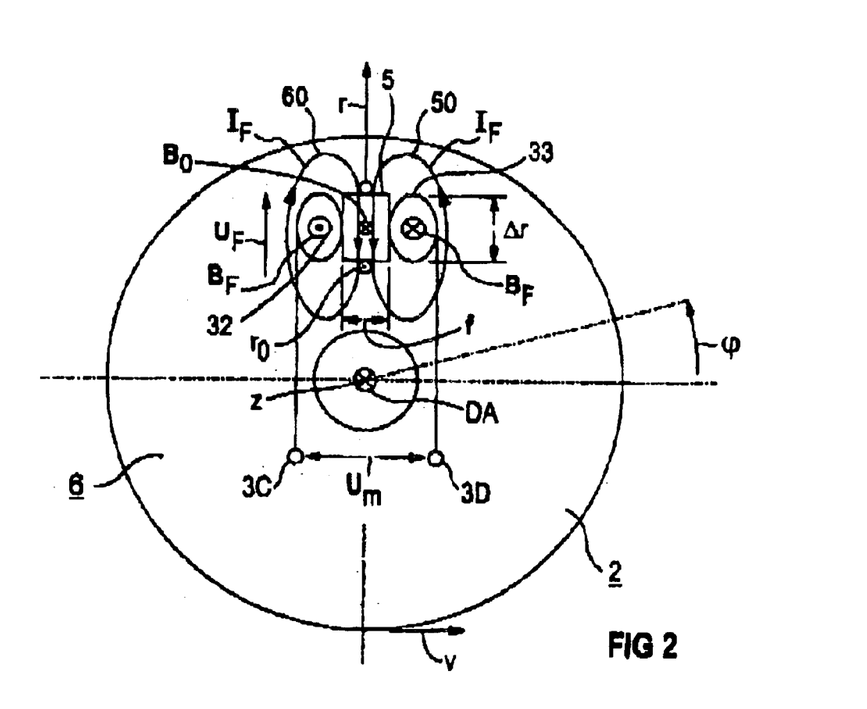
FIG. 2 shows schematically a top view of a device for measuring a motion of a translationally moving body.

FIG. 2 shows a motion sensor for measuring a rotating motion of a moving body 2 rotating about a rotation axis DA. The moving body 2 is preferably formed rotationally symmetric about the rotation axis DA, in particular in the form of a ring or a flat disk, so that the rotation axis DA is a major axis of inertia of the moving body 2, enabling a balanced rotation of the moving body 2. In FIG. 2, a cylindrical coordinate system with polar coordinates r and φ is selected in the rotation plane or polar plane oriented perpendicular to the rotation axis DA and the rotation axis DA forming the z-axis. The radial dimension in the r-direction of the partial area 5 penetrated by a DC magnetic field $B_0$ as an exciting field is indicated with Δr, the tangential dimension of the partial area 5 measured orthogonal to the radial direction is indicated by f.

In the partial area 5 penetrated by the magnetic field $B_0$ an electric voltage $U_F$ is induced which causes a current flow $I_F$ in the counter-rotating current eddies 50 and 60 which close over the partial area 6 of the moving body 2 that is not penetrated by the magnetic field $B_0$. These eddy currents $I_F$ produce a measurement magnetic field through induction $$|B_F| \sim |(\omega \times r_0) \times B_0|/\rho \tag{3}$$

with the angular or rotation speed $\omega = d\phi/dt \, e_z$, wherein $e_z$ is the unit vector in the z-direction, $r_0$ the radial vector pointing from the rotation axis DA to the partial area 5 penetrated by the magnetic field $B_0$, and ω is related to the orbital or circumferential velocity v which is oriented tangentially to the path or perpendicular to the radius vector in the r-direction, via the relationship $v = \omega \times r_0$.

In the embodiment according to FIG. 2, two induction coils 32 and 33 are arranged in the motion direction on opposite sides and with a lateral offset from the partial area 5 penetrated by the magnetic field $B_0$ or the permanent magnets (not shown) that produce the magnetic DC field $B_0$. The two induction coils 32 and 33 each measure as a measurement magnetic field $B_F$ an opposing magnetic flux density that is generated by the current eddies 50 and 60 having an opposite orientation. The two induction coils 32 and 33 have preferably an opposite winding direction and are connected in series, so that the induction voltages induced in the coils add to a total measurement voltage $U_m$ between the two measurement terminals 3C and 3D. This measurement voltage $U_m$ has the value $$U_m \sim d\omega/dt \tag{4}$$

Simultaneously, differential interferences caused by wobbling or tilting of the moving body 2 are compensated or suppressed.

Figure 3:
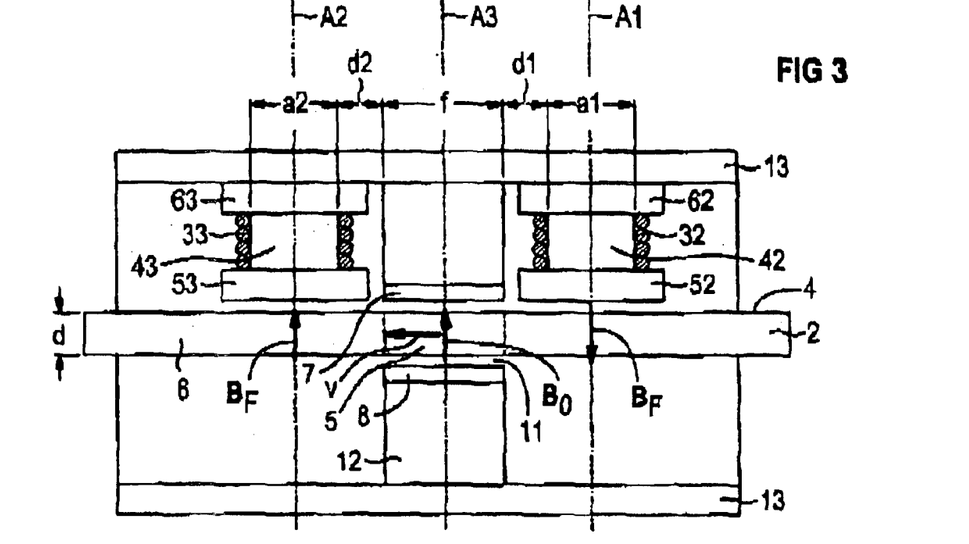
FIG. 3 shows schematically a device for measuring a motion of a moving body with two induction coils arranged next to two permanent magnets and next to an associated yoke in a longitudinal section.

FIG. 3 shows in a longitudinal section that includes the motion direction, a device for measuring a motion of a moving body 2 which in particular can be a linear moving body, as shown in FIG. 1, or a rotating disk, as shown in FIG. 2.

The moving body 2 passes through a gap 11 between two permanent magnets 7 and 8 which face each other with opposite magnetic poles. This produces an essentially homogeneous magnetic field $B_0$ pointing in the same direction, which penetrates the partial area 5 of the moving body 2 located in the gap 11. The magnetic field $B_0$ generates in the moving body 2 that moves with the velocity v eddy currents which cause a mutually induced measurement magnetic field $B_F$. The directions and orientations of the magnetic fields $B_0$ and $B_F$ are illustrated by corresponding arrows. The magnetic poles of the two disk-like permanent magnets 7 and 8 that face away from the gap 11 are magnetically short-circuited via a magnetically conducting yoke 12. In the embodiment of FIG. 3, the yoke is as wide as the two permanent magnets 7 and 8 in the motion direction and is flush with these magnets.

Two induction coils 32 and 33 for measuring the measurement magnetic field $B_F$ are arranged on the same side of the moving body 2 (in the upper area of FIG. 3). The two induction coils 32 and 33 laterally offset in the motion direction, i.e., in the direction of the velocity v, before and after the yoke 12 as well as relative to the permanent magnets 7 and 8. Since the orientation of the measurement magnetic field $B_F$ in the region located before the partial area 5 is opposite to that in the area located after the partial area 5, the winding directions or orientation sense of the two induction coils 32 and 33 are also interchanged (as in FIG. 2). The two induction coils 32 and 33 are also connected in series, so that the two measurement voltages are added. At the same time, differential interfering voltages are mutually compensated or subtracted in the two measurement or induction coils 32 and 33.

The center axis or coil axis of the induction coils 32 has the reference sign A1, the coil axis of the induction coil 33 has the reference sign A2 and a center axis of the magnetic field generating means with the permanent magnets 7 and 8 as well as the yoke 12 has the reference sign A3. All three axes A1, A2, and A3 are essentially parallel to each other and perpendicular to the surface 4 or to the motion direction of the moving body 2. The horizontal dimension of the induction coil 32, which is oriented perpendicular to the center axis A1, is indicated with the reference sign a1, and the corresponding dimension of induction coil 33 about the center axis A2, with the reference sign a2. Likewise, the dimension of the permanent magnets 7 and 8 as well as of the yoke 12 in the motion direction and hence perpendicular to the center axis A3 is indicated with the reference sign f.

The edges of the yoke 12, on one hand, and of the induction coils 32 and 33, on the other hand, are spaced apart in FIG. 3. The separation between the induction coil 32 and the yoke 12 is indicated with d1 and the separation between the induction coil 33 and the yoke 12 is indicated with d2. As a result of the lateral spacing between the induction coils 32 and 33 and the permanent magnets 7 and 8 and hence also the partial area 5 of the moving body 2 penetrated by the magnetic field $B_0$, the applied magnetic field $B_0$ is essentially not measured by the induction coils 32 and 33. As a result, the variations in the applied magnetic field $B_0$ caused by a potential temperature drift can also not adversely affect the measurement signal. This decreases the drift and noise of the entire detection device.

The two induction coils 32 and 33 are wound about corresponding coil cores 42 and 43 which are provided on the ends with two termination elements 52 and 62, and 53 and 63, respectively. The coil cores 42 and 43 as well as the termination elements 52, 53, 62 and 63 are preferably rotationally symmetric about the center axes A1 and/or A2, for example cylindrical, or at least rotationally symmetric with a predetermined multiplicity or mirror symmetric to a symmetry plane extending through the center axis A1 or A2, for example, with a four-sided or polygonal shape. The coil cores 42 and 43 can also be formed as a single piece with the corresponding termination elements 52 and 62, and 53 and 63, respectively.

Each unit with the induction coil 32 or 33, coil core 42 or 33, and termination elements 52 and 62, or 53 and 63, is secured on the side facing away from the moving body 2 on a support or mount 13 that is preferably made of a material having a good thermal conductivity, for example a metal. The yoke 12 is also attached to the support 13 between the two induction coils 32 and 33. These parts are preferably attached to the support 13 with screws. The support 13 can be U-shaped or an L-shaped. If the support 13 is U-shaped, as depicted in FIG. 3, then the yoke 12 can be attached to the support 13 on at least two sides or all the way around. A support 13 made of a heat-conducting material effectively cools the induction coils 32 and 33 as well as the yoke 12, and hence also the permanent magnets 7 and 8 connected with the yoke 12. This heat removal further decreases the temperature drift and noise.

The yoke 12 is preferably made of a soft iron material which has a large magnetic permeability, making it particularly suited for bridging large air gaps, such as the air gap 11. However, soft iron also has relatively high eddy current losses due to its relatively high electrical conductivity, and produces thermal noise. Since the yoke 12 and the coil cores 42 and 43 according to the invention are distinctly separated, a less noisy material can be used for the coil cores 42 and 43, for example a material based on iron powder (powder-metallurgically prepared molded body) or a ferrite, whereby the eddy current losses are reduced due to the granular structure and/or the magnetic and electrical properties.

Figure 4:
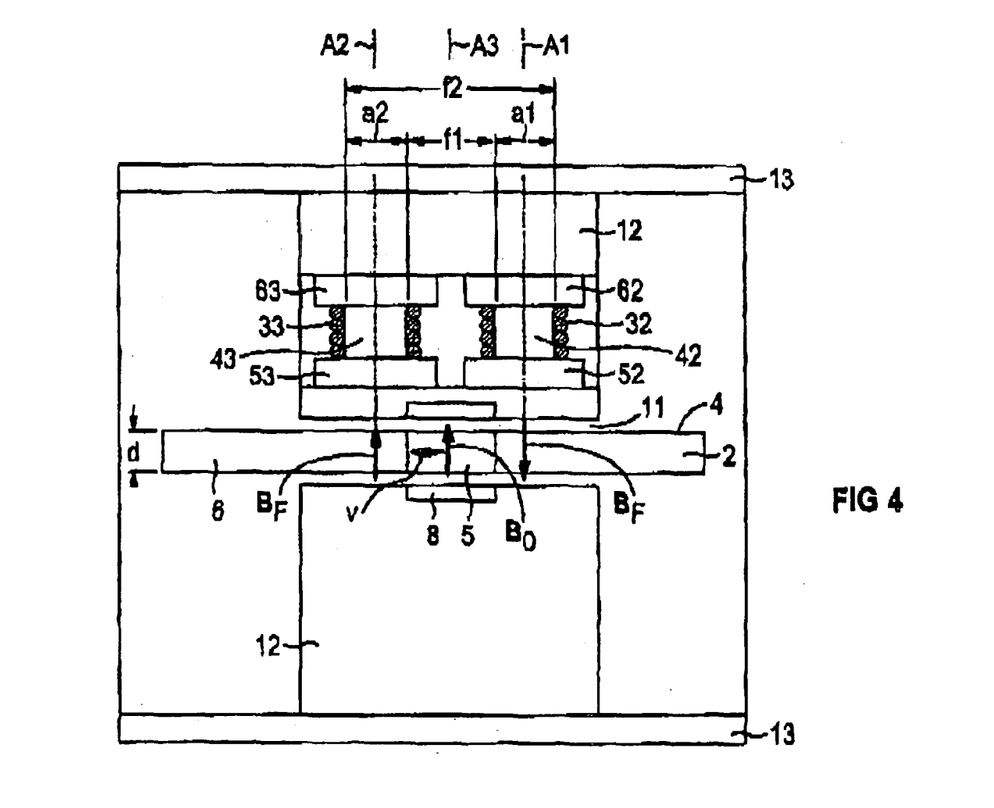
FIG. 4 shows schematically a device for measuring a motion of a moving body with two induction coils arranged next to two permanent magnets and inside an associated yoke in a longitudinal section.

In the embodiment according to FIG. 4, the induction coils 32 and 33 are arranged directly after the partial area 5 penetrated by the magnetic field $B_0$ or, correspondingly, after the permanent magnets 7 and 8 in the motion direction. The inside dimensions a1 and a2 follow immediately after the dimension f1 of the permanent magnets 7 and 8 in the motion direction. The distance of the coil axes A1 and A2 from the center axis A3 of the permanent magnets 7 and 8 is (a2+f1)/2 and (a1+f1)/2, respectively, wherein in the embodiment of FIG. 3 the additional distances d1 and d2 have to be added.

As shown in FIG. 4, the yoke 12 has a greater dimension in the motion direction than the permanent magnets 7 and 8, and furthermore includes the induction coils 32 and 33 with their coil cores 42 and 43, as well as the termination elements 52 and 62, and 53 and 63, respectively. The dimension of the yoke 12 in the motion direction is indicated by f2. In FIG. 4, f2 is greater than a1+f1+a2. As a result, the yoke 12 can not only be used for concentrating and guiding of the magnetic flux $B_0$ of the permanent magnets 7 and 8, but also for guiding the magnetic flux density $B_F$ of the measurement magnetic field. Moreover, the yoke 12 can totally support the induction coils 32 and 33 with the coil cores 42 and 43 and the termination elements 52 and 62, and 53 and 63, respectively. The termination elements 52 and 62, and 53 and 63, respectively, of each induction coil 32 and 33 are here connected to opposite sides of the yoke 12.

In the arrangement of FIG. 4, the measurement magnetic field $B_F$ normal to the motion direction (vertical field) advantageously is greatest directly at the boundary of the partial area 5, which makes it possible to achieve a very high sensor or measurement sensitivity.

Figure 5:
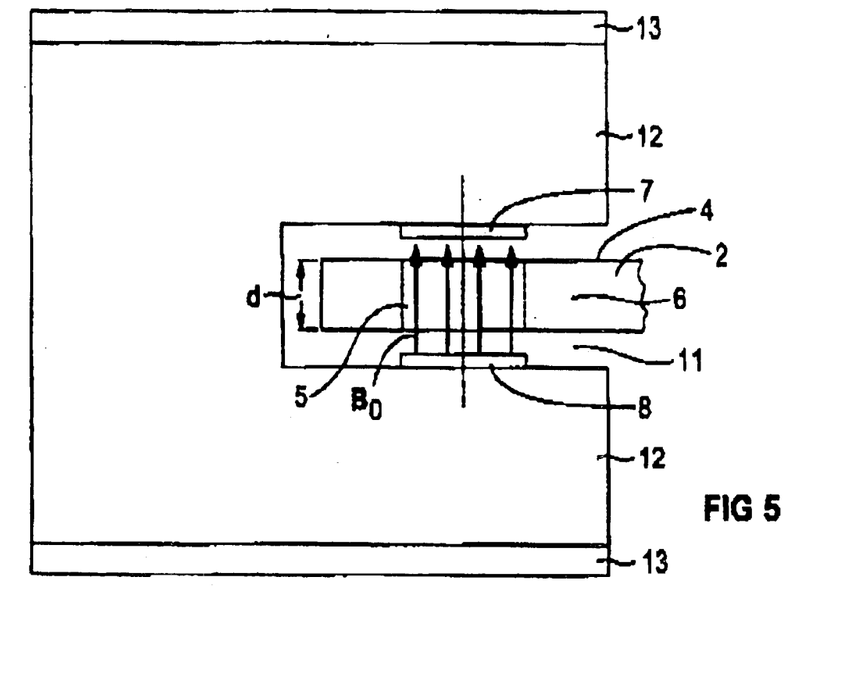
FIG. 5 shows schematically a cross section of a yoke with two permanent magnets that can be used with a device according to FIGS. 3 and 4.

FIG. 5 shows in a cross-sectional view perpendicular to the motion direction a U-shaped yoke 12, which encloses the gap 11 through which the moving body 2 moves. The two permanent magnets 7 and 8 are formed as plates or disks and arranged on the legs of the yoke 12 on both sides of the a gap so as to face each other. The magnetic field $B_0$ produced by the two permanent magnets 7 and 8 homogeneously penetrates the partial area 5 in the moving body 2. The partial area in the moving body 2 that is not penetrated by the magnetic field $B_0$ is indicated with the reference numeral 6. The magnetic field $B_0$ is closed via the yoke 12, which practically eliminates stray fields and related losses in sensitivity. The yoke 12 is attached on both sides of the support 13.

Figure 6:
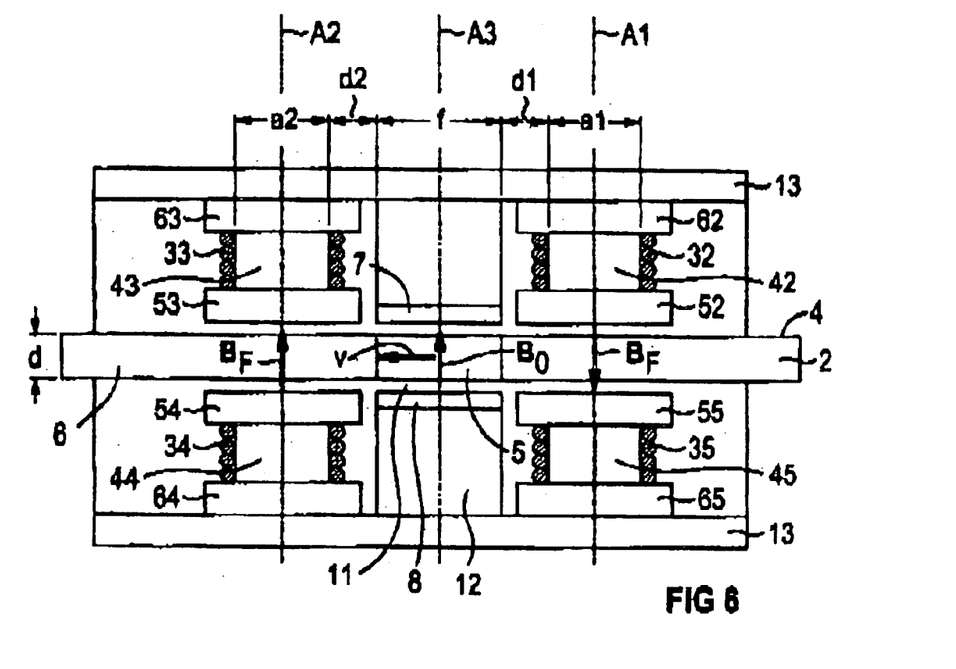
FIG. 6 shows schematically a device for measuring a motion of a moving body with four induction coils in a longitudinal section.

The additional embodiment of FIG. 6 is based on the embodiment of FIG. 3, with two additional induction coils 34 and 35 in addition to the two induction coils 32 and 33 being arranged mirror-symmetrically with respect to the moving body 2. The measuring device herein has four induction coils 32 to 35. The induction coils 32 and 35 have the same coil axis A1 and the same inside dimension a1 likewise, the induction coils 33 and 34 have the same coil axis A2 and the same inside dimension a2.

The induction coils 32 to 35 according to FIG. 6 are electrically connected with each other in such a way that the induction coils 32 and 35 have the same polarity and the induction coils 33 and 34 also have the same polarity, whereas the polarities of the induction coils 32 and 33, and 35 and 34, respectively, are opposite. This arrangement compensates or suppresses in the signals of the induction coils 33 and 34, and 32 and 35 interfering signals caused by undulations or similar local deviations in the geometry of the moving body 2. Furthermore, deviations in the spacing between the moving body 2 and the induction coils 32 to 35 caused, for example, by a wobble or tilt motion of the moving body 2 that occur over the entire area between the induction coils 32 and 33 and between the induction coils 34 and 35, no longer adversely affect the measurement signal. The measurement signal is in good approximation equal to the sum of the individual useful signals.

In another embodiment, the two coil termination elements 62 and 63, and 64 and 65, respectively, are magnetically connected with each other. This produces an essentially closed magnetic circuit for the measurement magnetic field $B_F$.

The two induction coils 32 and 33 according to one of the FIGS. 2 to 4 or FIG. 6, and the two coils 34 and 35 according to FIG. 6 are preferably symmetric to the center axis A3 of the permanent magnets 7 and 8 and hence also to the partial area 5, so that the coil axes A1 and A2 has the same distance from the center axis A3, with the inside diameters a1 and a2 of the induction coils 32 and 33 preferably also being identical. In FIG. 3, the distance d1 is therefore also identical to the distance d2, whereas in FIG. 4 only the inside diameters a1 and a2 of the induction coil 32 and 33 should be selected to be equal. Moreover, the induction coils 32 and 33, and 34 and 35, respectively, together with their coil cores 42 and 43 and the termination elements 52 and 62, and 53 and 63, respectively, are constructed in an essentially identical manner, except for the different winding direction. The symmetric arrangement and the identical construction produces an essentially identical useful signal from the two induction coils 32 and 33 and almost completely compensates interfering signals when the induction coils 32 and 33 are connected anti-parallel (or in series with opposing winding direction).

Alternatively or in addition, the velocity v can be measured in all embodiments for a translational motion by directly measuring the absolute value $B_F=|B_F|$ with at least one suitably arranged magnetic field sensor according to the relationships (1) or (3), and the angular velocity $\omega$ can be measured for a rotating motion either directly or analog, i.e., in particular without differentiation or integration.

What is claimed is:

1. A device for measuring a motion of a moving body having a motion direction and at least one region that is electrically conducting, comprising:

magnetic field generating means for producing a magnetic field, which penetrates at least one spatially limited partial area of the at least one electrically conducting region of the moving body;

at least two measuring devices arranged on opposite sides of the moving body and outside the magnetic field of the magnetic field generating means, for measuring a measurement magnetic field that is induced by electrical currents in the at least one electrically conducting region of the moving body, with the measurement magnetic field representing at least one motion variable of the moving body, wherein the at least two measuring devices are constructed so as to produce identical measurement signals for a motion of the moving body performed in an identical manner.

2. A device for measuring a motion of a moving body having a motion direction and at least one region that is electrically conducting, comprising:

magnetic field generating means for producing a magnetic field, which penetrates at least one spatially limited partial area of the at least one electrically conducting region of the moving body;

at least two measuring devices arranged on opposite sides of the moving body and outside the magnetic field of the magnetic field generating means, for measuring a measurement magnetic field that is induced by electrical currents in the at least one electrically conducting region of the moving body, with the measurement magnetic field representing at least one motion variable of the moving body, wherein the at least two measuring devices are arranged essentially symmetrically with respect to the magnetic field generating means or the moving body.

3. The device of claim 2, and further comprising at least two pairs of measuring devices that are arranged on opposite sides of the moving body, wherein the at least two pairs are arranged in the motion direction on opposite sides of the magnetic field generating means.

4. The device of claim 2, and further comprising first magnetic flux guiding means associated with the at least two measuring devices for guiding the measurement magnetic field.

5. The device of claim 4, and further comprising second magnetic flux guiding means associated with the magnetic field generating means for guiding the measurement magnetic field.

6. The device of claim 4, wherein the first magnetic flux guiding means are made at least predominately of a material comprising iron powder or a ferritic magnetic material.

7. The device of claim 5, wherein at least one of the first and second magnetic flux guiding means form a closed magnetic circuit.

8. The device of claim 5, wherein the first magnetic flux guiding means and the second magnetic flux guiding means are formed separate of each other.

9. The device of claim 5, wherein the first magnetic flux guiding means and the second magnetic flux guiding means are formed at least partially in common.

10. The device of claim 5, wherein the first and second magnetic flux guiding means are made of material selected from the group having a high electrical conductivity, a high magnetic conductivity, low eddy current losses and a low noise.

11. The device of claim 5, wherein the first and second magnetic flux guiding means are made substantially of a soft magnetic material.

12. The device of claim 5, wherein at least one of magnetic permeability and eddy current losses of the second magnetic flux guiding means are higher than corresponding magnetic permeability and eddy current losses of the first magnetic flux guiding means.

13. The device of claim 2, and further comprising second magnetic flux guiding means associated with the magnetic field generating means for guiding the measurement magnetic field.

14. The device of claim 13, wherein the second magnetic flux guiding means comprise soft iron.

15. The device of claim 13, wherein in the motion direction, the at least one measuring device is arranged adjacent to the second magnetic flux guiding means with an offset thereto.

16. The device of claim 13, wherein the at least one measuring device is arranged in the motion direction at least partially within the second magnetic flux guiding means and offset from the magnetic field generating means comprising at least one permanent magnet.

17. The device of claim 2, wherein the magnetic field generating means comprises at least one permanent magnet having opposite magnetic poles facing each other, with the moving body moving between the magnetic poles.

18. The device of claim 2, wherein the at least one measuring device includes at least one magnetic field sensor selected from the group consisting of Hall sensor, a magneto-resistive sensor and field plate.

19. A device for measuring a motion of a moving body having a motion direction and at least one region that is electrically conducting, comprising:

magnetic field generating means for producing a magnetic field, which penetrates at least one spatially limited partial area of the at least one electrically conducting region of the moving body;

at least two measuring devices arranged on opposite sides of the moving body and outside the magnetic field of the magnetic field generating means, for measuring a measurement magnetic field that is induced by electrical currents in the at least one electrically conducting region of the moving body, with the measurement magnetic field representing at least one motion variable of the moving body, wherein the measurement signals of the at least two measuring devices are superimposed with an identical polarity, and wherein interfering signals caused by changes in distance between the moving body and the measuring devices are superimposed with an opposite polarity.

20. The device of claim 19, wherein the at least two measuring devices are electrically connected with opposite polarity.

21. A device for measuring a motion of a moving body having a motion direction and at least one region that is electrically conducting, comprising:

magnetic field generating means for producing a magnetic field, which penetrates at least one spatially limited partial area of the at least one electrically conducting region of the moving body;

at least two measuring devices arranged on the same side of the moving body and outside the magnetic field of the magnetic field generating means, for measuring a measurement magnetic field that is induced by electrical currents in the at least one electrically conducting region of the moving body, with the measurement magnetic field representing at least one motion variable of the moving body, wherein the measurement signals of the at least two measuring devices are superimposed with an identical polarity, and wherein interfering signals caused by changes in distance between the moving body and the measuring devices are superimposed with an opposite polarity.

22. The device of claim 21, wherein the at least two measuring devices are electrically connected with opposite polarity.

23. The device of claim 21, wherein the at least two measuring devices are arranged essentially symmetrically with respect to the magnetic field generating means or the moving body.

24. The device of claim 21, wherein the at least two measuring devices are constructed so as to produce identical measurement signals of an identical motion of the moving body.

25. A device for measuring a motion of a moving body having a motion direction and at least one region that is electrically conducting, comprising:

magnetic field generating means for producing a magnetic field, which penetrates at least one spatially limited partial area of the at least one electrically conducting region of the moving body;

at least one measuring device arranged outside the magnetic field of the magnetic field generating means and having at least one induction coil for measuring a measurement magnetic field that is induced by electrical currents in the at least one electrically conducting region of the moving body, with the measurement magnetic field representing at least one motion variable of the moving body; and at least one magnetically conducting termination element arranged on end faces of the at least one induction coil.

26. The device of claim 15, wherein the magnetic field generating means, at least one of the measuring devices, or the termination element are at least one of secured and thermally coupled to an associated support or a to common support.

27. The device of claim 26, wherein the associated or common support is made of a metal with a good thermal conductivity.

28. A device for measuring a motion of a moving body having a motion direction and at least one region that is electrically conducting, comprising:

magnetic field generating means for producing a magnetic field, which penetrates at least one spatially limited partial area of the at least one electrically conducting region of the moving body; and at least two measuring heads, each having at least one measuring device for measuring a measurement magnetic field that is induced by electrical currents in the at least one electrically conducting region of the moving body, with the measurement magnetic field representing at least one motion variable of the moving body, wherein the at least one measuring device is arranged outside the magnetic field of the magnetic field generating means, and wherein the magnetic field generating means are arranged diametrically opposed with respect to the rotation axis.

29. The device of claim 28, wherein the magnetic field generating means produce a magnetic field that penetrates the electrically conductive region of the moving body in a partial area that is contiguous in the motion direction of the moving body.

* * * * *